US011629643B1

(12) United States Patent
Susca

(10) Patent No.: US 11,629,643 B1
(45) Date of Patent: Apr. 18, 2023

(54) FUEL PUMP SYSTEMS

(71) Applicant: Hamilton Sundstrand Corporation, Charlotte, NC (US)

(72) Inventor: Ryan Susca, Windsor, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/571,055

(22) Filed: Jan. 7, 2022

(51) Int. Cl.
| | |
|---|---|
| *F02C 7/236* | (2006.01) |
| *F02C 7/232* | (2006.01) |
| *F02M 37/00* | (2006.01) |
| *B60K 15/03* | (2006.01) |
| *F02C 7/22* | (2006.01) |
| *F02C 7/228* | (2006.01) |
| *F02C 7/262* | (2006.01) |
| *F02C 9/28* | (2006.01) |

(52) U.S. Cl.
CPC ............. *F02C 7/236* (2013.01); *B60K 15/03* (2013.01); *F02C 7/222* (2013.01); *F02C 7/228* (2013.01); *F02C 7/232* (2013.01); *F02C 7/262* (2013.01); *F02C 9/28* (2013.01); *F02M 37/0017* (2013.01); *F02M 37/0047* (2013.01); *B60K 2015/0319* (2013.01); *B60K 2015/03243* (2013.01); *B60K 2015/03256* (2013.01); *F05D 2220/323* (2013.01); *F05D 2270/304* (2013.01)

(58) Field of Classification Search
CPC .. F02C 7/22; F02C 7/232; F02C 7/236; F02C 9/30; F02M 37/0047; F04B 23/04; F04B 23/14; F04D 13/12; F04D 13/14; F04D 15/0072; F23K 5/04
See application file for complete search history.

(56) References Cited

U.S. PATENT DOCUMENTS

| | | | | |
|---|---|---|---|---|
| 5,118,258 A | * | 6/1992 | Martin | F02C 7/236 |
| | | | | 60/734 |
| 8,205,597 B2 | * | 6/2012 | Brocard | F02C 7/22 |
| | | | | 123/457 |
| 8,276,360 B2 | | 10/2012 | Poisson et al. | |
| 9,316,157 B2 | | 4/2016 | Ripley et al. | |
| 9,677,477 B2 | * | 6/2017 | Oba | F02C 7/236 |
| 9,885,287 B2 | | 2/2018 | Striker et al. | |
| 10,138,816 B2 | * | 11/2018 | Yates | F04B 41/06 |
| 10,669,943 B2 | | 6/2020 | Weir et al. | |
| 11,060,461 B2 | * | 7/2021 | Turney | F02C 7/236 |
| 11,236,682 B2 | * | 2/2022 | Veilleux, Jr. | F04D 13/12 |
| 2002/0069856 A1 | * | 6/2002 | Mayer | F02M 37/041 |
| | | | | 123/495 |
| 2006/0266047 A1 | * | 11/2006 | Eick | F02C 7/262 |
| | | | | 60/734 |

(Continued)

*Primary Examiner* — Alain Chau
(74) *Attorney, Agent, or Firm* — Locke Lord LLP; Scott Wofsy; Daniel J. Fiorello

(57) ABSTRACT

A fuel pump system, comprising an inlet line and a motorized pump, a first selector valve in fluid communication with an inlet line at a first inlet port and in fluid communication with the motorized pump outlet via a first outlet branch at a second inlet port to receive fuel from the motorized pump outlet. The system can also include a main fuel pump in fluid communication with the first selector valve and a second selector valve, wherein the second selector valve can be in fluid communication with the main fuel pump and in fluid communication with the motorized pump outlet.

20 Claims, 2 Drawing Sheets

(56) References Cited

U.S. PATENT DOCUMENTS

| | | | |
|---|---|---|---|
| 2010/0126136 A1* | 5/2010 | Anson | F02C 7/22 60/734 |
| 2011/0139123 A1* | 6/2011 | Brocard | F02C 9/28 123/495 |
| 2014/0196459 A1* | 7/2014 | Futa | F02C 7/22 60/734 |
| 2014/0196463 A1* | 7/2014 | Zielinski | F02C 7/236 60/734 |
| 2016/0146108 A1* | 5/2016 | Yates | F02C 7/236 415/124.1 |
| 2016/0201564 A1* | 7/2016 | Oba | F23K 5/04 137/565.3 |
| 2018/0050812 A1* | 2/2018 | Ribarov | F02C 7/236 |
| 2019/0112987 A1 | 4/2019 | O'Rorke et al. | |
| 2019/0257250 A1* | 8/2019 | Veilleux, Jr. | F04D 13/12 |
| 2020/0191058 A1* | 6/2020 | Turney | F02C 7/236 |
| 2020/0300169 A1* | 9/2020 | Turney | F02C 7/32 |
| 2020/0318506 A1* | 10/2020 | Malsot | F01M 5/005 |
| 2021/0079848 A1 | 3/2021 | Cocks et al. | |
| 2021/0102517 A1 | 4/2021 | Susca et al. | |

\* cited by examiner

FUEL PUMP SYSTEMS

FIELD

This disclosure relates to fuel pump systems (e.g., for aircraft).

BACKGROUND

In many fuel delivery systems, the main pump is not optimized for the entire operating range, which results in waste power and excess heat. The main pump is generally oversized to pump suitable fuel at low speeds, which generally requires the pump to be heavier and larger than is strictly necessary.

Such conventional methods and systems have generally been considered satisfactory for their intended purpose. However, there is still a need in the art for improved fuel pump systems. The present disclosure provides a solution for this need.

SUMMARY

A fuel pump system can include an inlet line and a motorized pump having a motorized pump inlet in fluid communication with the inlet line to receive fuel from the inlet line, and a motorized pump outlet configured to output flow from the motorized pump. The system can include a first selector valve in fluid communication with the inlet line at a first inlet port. The first selector valve can be in fluid communication with the motorized pump outlet via a first outlet branch at a second inlet port to receive fuel from the motorized pump outlet. The first selector valve can be configured to selectively communicate the first inlet port to an outlet port, and to selectively communicate the second inlet port to the outlet port. The system can also include a main fuel pump having a main fuel pump inlet in fluid communication with the first selector valve to be downstream of the first selector valve, and having a main fuel pump outlet. The system can include a second selector valve in fluid communication with the main fuel pump outlet at a first input port. The second selector valve can be in fluid communication with the motorized pump outlet via a second outlet branch at a second input port to receive fuel from the motorized pump outlet. The second selector valve can be configured to selectively communicate the first input port to an output port, and to selectively communicate the second input port to the output port. The output port can be in fluid communication with an outlet line.

In certain embodiments, the first selector valve is actively controlled. For example, in certain embodiments, the first selector valve can be a solenoid valve.

In certain embodiments, the second selector valve can be a passive valve such that the second selector valve can be configured to selectively communicate the first input port to an output port when a pressure from the main fuel pump exceeds a pressure from the motorized fuel pump or exceeds a set threshold. In certain embodiments, each selector valve is a three-way valve.

The system can include a controller configured to control a motor connected to the motorized pump to drive the motorized pump. The controller can be configured to operate the first selector valve to select whether the first inlet port is in communication with the outlet port, or whether the second inlet port is in communication with the outlet port. In certain embodiments, the controller can be configured to operate the motor and the first selector valve to provide a plurality of modes. The plurality of modes can include a low flow mode where only the motorized pump provides flow to the outlet line, a mid-flow mode where only the main fuel pump provides flow to the outlet line, and a high flow mode where both the motorized pump and the main fuel pump are operated in series to provide flow to the outlet line.

In certain embodiments, the main fuel pump can be a centrifugal pump. The motorized pump can also be a centrifugal pump, for example. Any suitable pump types are contemplated herein.

In accordance with at least one aspect of this disclosure, an aircraft can include a fuel pump system. The fuel pump system can be any suitable embodiment of a system disclosed herein, e.g., as described above.

In accordance with at least one aspect of this disclosure, a fuel pump system can include a motorized pump, a first selector valve in direct fluid communication with and downstream of the motorized pump, a second selector valve in direct fluid communication with and downstream of the motorized pump, the second selector valve connected to an output line for outputting fuel to an engine, and a main fuel pump disposed between the first selector valve and the second selector valve. The first and second selector valves can be configured to allow flow through only the motorized pump to bypass the main fuel pump to the outlet line in low flow mode, to allow flow through only the main fuel pump to bypass the motorized pump to the outlet line in a mid-flow mode, and to allow flow through the motorized pump to output to an inlet of the main fuel pump to then output from the main fuel pump to the outlet line in a high flow mode.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
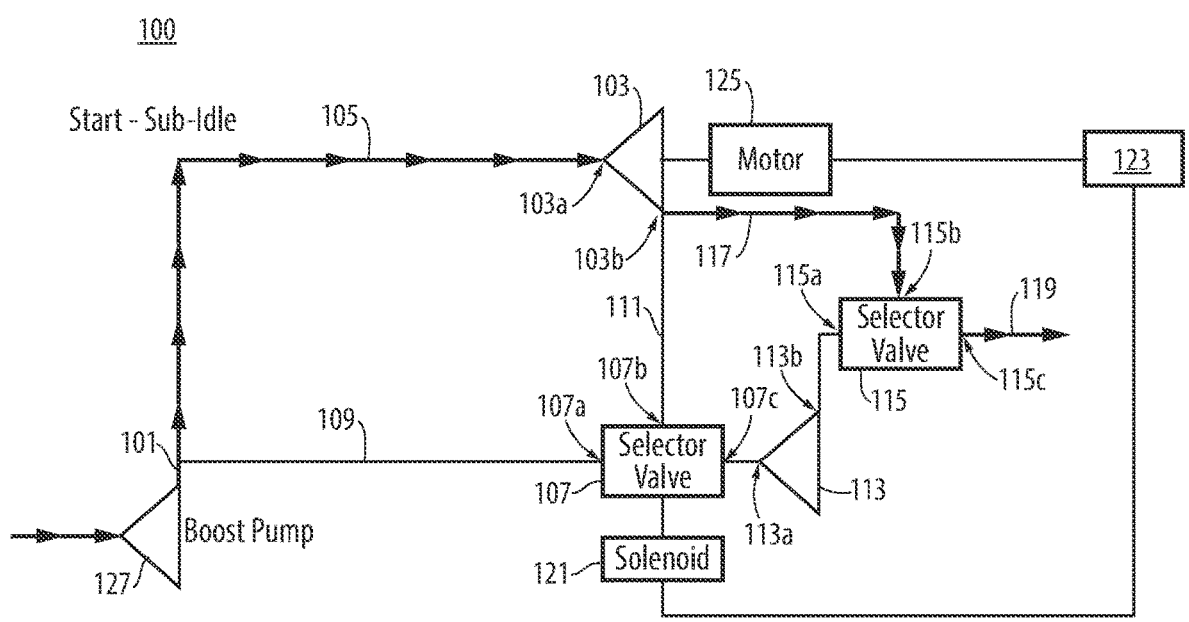
FIG. 1 is a schematic diagram of an embodiment of a system in accordance with this disclosure, shown operating in a low flow mode.
Figure 2:
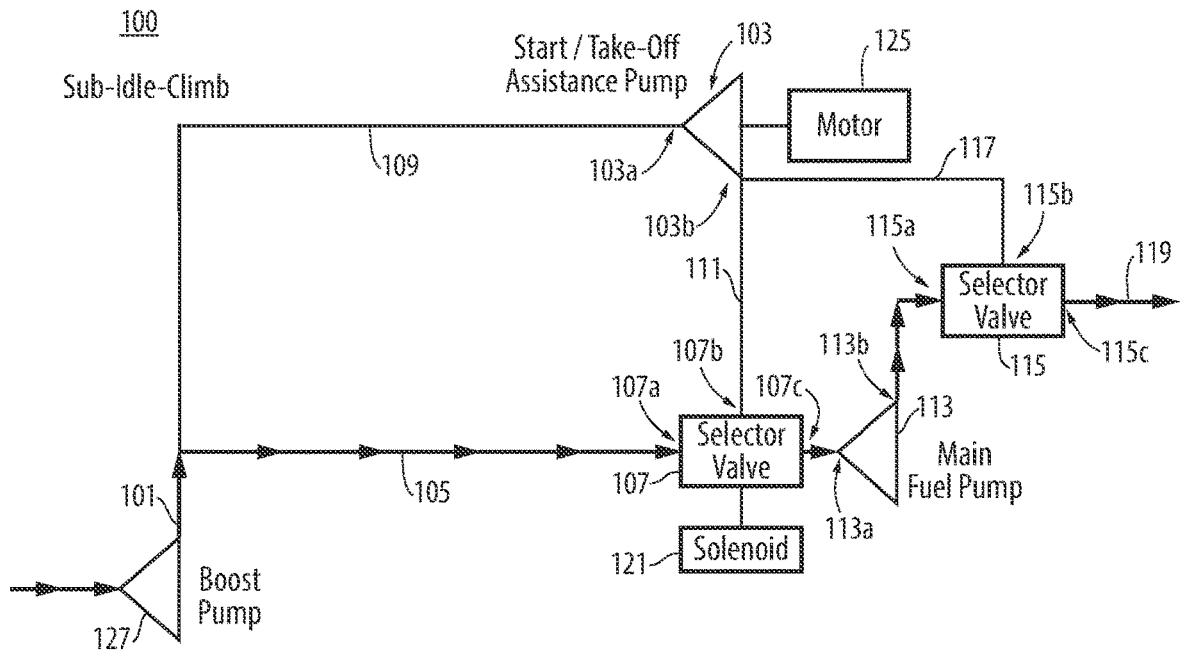
FIG. 2 is a schematic diagram of the embodiment of FIG. 1, shown operating in a mid-flow mode.
Figure 3:
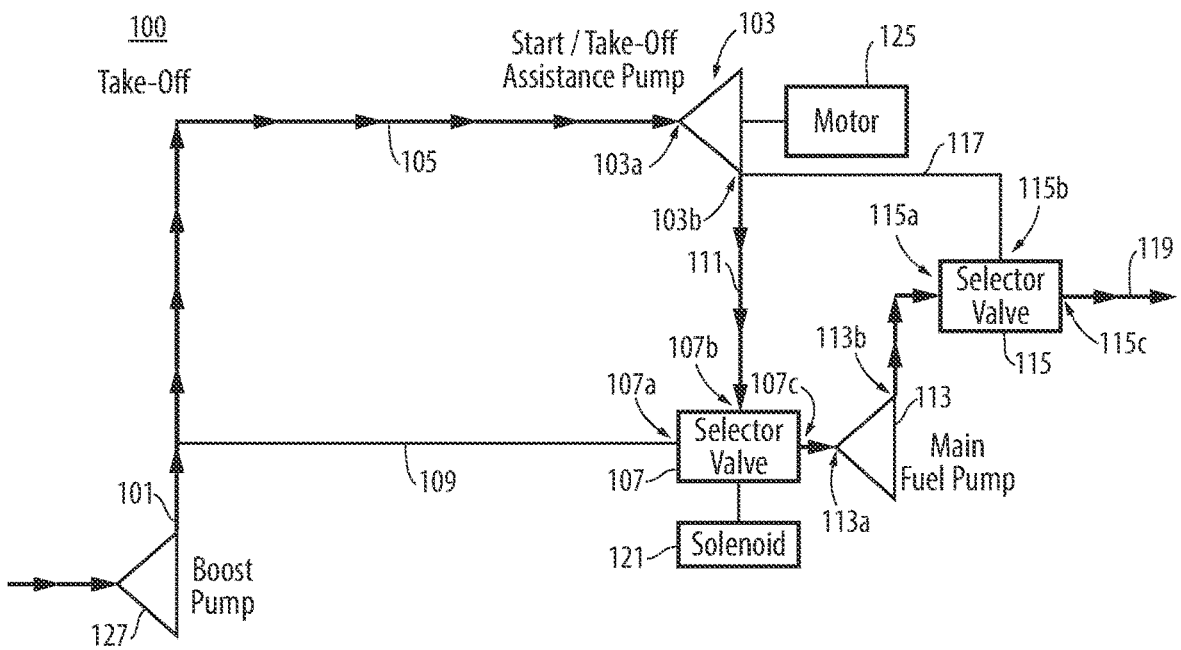
FIG. 3 is a schematic diagram of the embodiment of FIG. 1, shown operating in a high flow mode.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

In accordance with at least one aspect of this disclosure, referring to FIG. 1, a fuel pump system 100 can include an inlet line 101. The system 100 can also include a motorized pump 103 having a motorized pump inlet 103a in fluid communication with the inlet line 101 (e.g., via a first inlet branch 105) to receive fuel from the inlet line 101, and a motorized pump outlet 103*b* configured to output flow from the motorized pump 103.

The system 100 can include a first selector valve 107 in fluid communication with the inlet line 101 (e.g., via a second inlet branch 109) at a first inlet port 107*a*. The first selector valve 107 can be in fluid communication with the motorized pump outlet 103*b* via a first outlet branch 111 at a second inlet port 107*b* to receive fuel from the motorized pump outlet 103*b*. The first selector valve 107 can be configured to selectively communicate the first inlet port 107*a* to an outlet port 107*c*, and to selectively communicate the second inlet port 107*b* to the outlet port 107*c*.

The system 100 can also include a main fuel pump 113 having a main fuel pump inlet 113*a* in fluid communication with the first selector valve 107 to be downstream of the first selector valve 107, and having a main fuel pump outlet 113*b*. The system 100 can include a second selector valve 115 in fluid communication with the main fuel pump outlet 113*b* at a first input port 115*a*. The second selector valve 115 can be in fluid communication with the motorized pump outlet 103*b* via a second outlet branch 117 at a second input port 115*b* to receive fuel from the motorized pump outlet 103*b*. The second selector valve 115 can be configured to selectively communicate the first input port 115*a* to an output port 115*c*, and to selectively communicate the second input port 115*b* to the output port 115*c*. The output port 115*c* can be in fluid communication with an outlet line 119.

In certain embodiments, the first selector valve 107 can be actively controlled. For example, in certain embodiments, the first selector valve 107 can be a solenoid valve (e.g., driven by a solenoid 121 as shown). Any other suitable controllable valve (e.g., via hydraulics) and/or any suitable passive valve configured to function as disclosed herein is contemplated herein.

In certain embodiments, the second selector valve 115 can be a passive valve such that the second selector valve 115 can be configured to selectively communicate the first input port 115*a* to the output port 115*c* when a pressure from the main fuel pump 113 exceeds a pressure from the motorized fuel pump 103 or exceeds a set threshold (to cause the selector valve 115 to shut off flow from the motorized pump 103 to the outlet line 119 and to allow flow from the main pump 113 to flow to the outlet line 119). The second selector valve 115 can be any suitable valve type (e.g., passive or active). In certain embodiments, each selector valve 107, 115 can be a three-way valve.

The system 100 can include a controller 123 configured to control a motor 125 (e.g., an electric motor) connected to the motorized pump 103 to drive the motorized pump 103. The controller 123 can be configured to operate the first selector valve 107 (e.g., by controlling solenoid 121) to select whether the first inlet port 107*a* is in communication with the outlet port 107*c*, or whether the second inlet port 107*b* is in communication with the outlet port 107*c*. The controller 123 can include any suitable hardware and/or software module(s) configured to perform an suitable function disclosed herein, e.g., as described above and below.

In certain embodiments, the controller 123 can be configured to operate the motor 125 and the first selector valve 107 to provide a plurality of modes, e.g., referring additionally to FIGS. 2 and 3. The plurality of modes can include a low flow mode (e.g., for start to sub-idle flow as shown in FIG. 1) where only the motorized pump 103 provides flow to the outlet line 119, a mid-flow mode (e.g., for sub-idle to climb flow as shown in FIG. 2) where only the main fuel pump 113 provides flow to the outlet line 119 (e.g., and the motor 125 can be depowered), and a high flow mode (e.g., for take-off flow as shown in FIG. 3) where both the motorized pump 103 and the main fuel pump 113 are operated in series to provide flow to the outlet line 119 (e.g., which can be connected to a combustor of a turbomachine). Any other suitable mode(s) is/are contemplated herein.

In certain embodiments, the main fuel pump 113 can be a centrifugal pump. The motorized pump 103 can also be a centrifugal pump, for example. Any suitable pump types are contemplated herein. Centrifugal pumps can be, smaller, lighter, stronger, and more efficient than certain other pumps, which can be beneficial (e.g., for aircraft systems).

In certain embodiments, a boost pump 127 can be upstream of the inlet line 101 (e.g., and connected to a fuel supply) to provide boost pressure to the pump 103, 113, for example. Any other suitable flow devices and/or components in the system 100 are contemplated herein.

In accordance with at least one aspect of this disclosure, an aircraft (not shown) can include a fuel pump system 100. The fuel pump system 100 can be any suitable embodiment of a system disclosed herein, e.g., as described above.

In accordance with at least one aspect of this disclosure, a fuel pump system 100 can include a motorized pump 103, a first selector valve 107 in direct fluid communication with and downstream of the motorized pump 103, a second selector valve 115 in direct fluid communication with and downstream of the motorized pump 103. The second selector valve 115 can be connected to an output line 119 for outputting fuel to an engine. The system 100 can include a main fuel pump 113 disposed between the first selector valve 107 and the second selector valve 115. The first and second selector valves 107, 115 can be configured to allow flow through only the motorized pump 103 to bypass the main fuel pump 107 to the outlet line 119 in a low flow mode (e.g., as shown in FIG. 1), to allow flow through only the main fuel pump 113 to bypass the motorized pump 103 to the outlet line 119 in a mid-flow mode (e.g., as shown in FIG. 2), and to allow flow through the motorized pump 103 to output to an inlet 113*a* of the main fuel pump 113 to then output from the main fuel pump 113 to the outlet line 119 in a high flow mode (e.g., as shown in FIG. 3).

Embodiments can include a fail-safe setting such that the first selector valve 107 and second selector valve 115 are configured to communicate the main pump 113 with the outlet line 119 in a failure state. Thus, the valves can fail to allow main pump flow (e.g., as shown in FIG. 2 and/or FIG. 3).

Embodiments can include an electric start and high power assistance pump system. In certain embodiments, through the use of two selector valves (e.g., one active and one passive) the pump providing flow to a fuel control valve can be switched or combined. First, an electric motorized pump can be engaged for engine start to sub-idle speeds (e.g., the main pump driven by the engine being bypassed), and at a designated sub-idle speed the main pump can generate sufficient pressure to shuttle a passive selector valve to select the main pump as the fuel source and the electric motorized pump can be depowered. The main pump can support the flow requirements up to cruise or climb power levels, for example. Above this, the electric motorized pump can be re-engaged and the active selector valve can be switched to put the main pump and electric motorized pump in series. The electric motorized pump can boost the inlet pressure to the main pump to support the engine for climb and/or take-off power levels.

Embodiments provide improvements over single gear pump systems (main/servo flow) and twin gear pump systems (separate main and servo or pairable pumps), for example. Embodiments can enable increased main pump efficiency, reduced power extraction, reduced fuel temp rise, elimination of bypass flow, reduced IFPC size/weight, improved TSFC at cruise, and improved contamination resistance (e.g., due to centrifugal pump use). Embodiments can also provide improvements over a dual centrifugal pump system by providing increased main pump efficiency, reduced power extraction and TSFC a cruise, reduced fuel temp rise, and reduced IFPC size/weight.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel pump system, comprising:
   an inlet line;
   a motorized pump having a motorized pump inlet in fluid communication with the inlet line to receive fuel from the inlet line, and a motorized pump outlet configured to output flow from the motorized pump;
   a first selector valve in fluid communication with the inlet line at a first inlet port, wherein the first selector valve is in fluid communication with the motorized pump outlet via a first outlet branch at a second inlet port to receive fuel from the motorized pump outlet, wherein the first selector valve is configured to selectively communicate the first inlet port to an outlet port, and to selectively communicate the second inlet port to the outlet port;
   a main fuel pump having a main fuel pump inlet in fluid communication with the first selector valve to be downstream of the first selector valve, and having a main fuel pump outlet; and
   a second selector valve in fluid communication with the main fuel pump outlet at a first input port, wherein the second selector valve is in fluid communication with the motorized pump outlet via a second outlet branch at a second input port to receive fuel from the motorized pump outlet, wherein the second selector valve is configured to selectively communicate the first input port to an output port, and to selectively communicate the second input port to the output port, wherein the output port is in fluid communication with an outlet line.

2. The system of claim 1, wherein the first selector valve is actively controlled.

3. The system of claim 2, wherein the first selector valve is a solenoid valve.

4. The system of claim 2, wherein the second selector valve is a passive valve such that the second selector valve is configured to selectively communicate the first input port to an output port when a pressure from the main fuel pump exceeds a pressure from the motorized fuel pump or exceeds a set threshold.

5. The system of claim 1, wherein each selector valve is a three-way valve.

6. The system of claim 1, further comprising a controller configured to control a motor connected to the motorized pump to drive the motorized pump.

7. The system of claim 6, wherein the controller is configured to operate the first selector valve to select whether the first inlet port is in communication with the outlet port, or whether the second inlet port is in communication with the outlet port.

8. The system of claim 7, wherein the controller is configured to operate the motor and the first selector valve to provide a low flow mode wherein only the motorized pump provides flow to the outlet line, a mid-flow mode wherein only the main fuel pump provides flow to the outlet line, and a high flow mode wherein both the motorized pump and the main fuel pump are operated in series to provide flow to the outlet line.

9. The system of claim 1, wherein the main fuel pump is a centrifugal pump.

10. The system of claim 9, wherein the motorized pump is a centrifugal pump.

11. An aircraft, comprising:
    a fuel pump system, comprising:
    an inlet line;
    a motorized pump having a motorized pump inlet in fluid communication with the inlet line to receive fuel from the inlet line, and a motorized pump outlet configured to output flow from the motorized pump;
    a first selector valve in fluid communication with the inlet line at a first inlet port, wherein the first selector valve is in fluid communication with the motorized pump outlet via a first outlet branch at a second inlet port to receive fuel from the motorized pump outlet, wherein the first selector valve is configured to selectively communicate the first inlet port to an outlet port, and to selectively communicate the second inlet port to the outlet port;
    a main fuel pump having a main fuel pump inlet in fluid communication with the first selector valve to be downstream of the first selector valve, and having a main fuel pump outlet; and
    a second selector valve in fluid communication with the main fuel pump outlet at a first input port, wherein the second selector valve is in fluid communication with the motorized pump outlet via a second outlet branch at a second input port to receive fuel from the motorized pump outlet, wherein the second selector valve is configured to selectively communicate the first input port to an output port, and to selectively communicate the second input port to the output port, wherein the output port is in fluid communication with an outlet line.

12. The aircraft of claim 11, wherein the first selector valve is actively controlled.

13. The aircraft of claim 12, wherein the first selector valve is a solenoid valve.

14. The aircraft of claim 12, wherein the second selector valve is a passive valve such that the second selector valve is configured to selectively communicate the first input port to an output port when a pressure from the main fuel pump exceeds a pressure from the motorized fuel pump or exceeds a set threshold.

15. The aircraft of claim 11, wherein each selector valve is a three-way valve.

16. The aircraft of claim 11, further comprising a controller configured to control a motor connected to the motorized pump to drive the motorized pump.

17. The aircraft of claim 16, wherein the controller is configured to operate the first selector valve to select whether the first inlet port is in communication with the outlet port, or whether the second inlet port is in communication with the outlet port.

18. The aircraft of claim 17, wherein the controller is configured to operate the motor and the first selector valve to provide a low flow mode wherein only the motorized pump provides flow to the outlet line, a mid-flow mode wherein only the main fuel pump provides flow to the outlet line, and a high flow mode wherein both the motorized pump and the main fuel pump are operated in series to provide flow to the outlet line.

19. The aircraft of claim 11, wherein the main fuel pump is a centrifugal pump.

20. A fuel pump system, comprising:
an inlet line;
a motorized pump having a motorized pump inlet in fluid communication with the inlet line to receive fuel from the inlet line, and a motorized pump outlet configured to output flow from the motorized pump;
a first selector valve in fluid communication with the inlet line at a first inlet port, wherein the first selector valve is in fluid communication with the motorized pump outlet via a first outlet branch at a second inlet port to receive fuel from the motorized pump outlet, wherein the first selector valve is configured to selectively communicate the first inlet port to an outlet port, and to selectively communicate the second inlet port to the outlet port;
a main fuel pump having a main fuel pump inlet in fluid communication with the first selector valve to be downstream of the first selector valve, and having a main fuel pump outlet; and
a second selector valve in direct fluid communication with the main fuel pump outlet at a first input port, wherein the second selector valve is in fluid communication with the motorized pump outlet via a second outlet branch at a second input port to receive fuel from the motorized pump outlet, wherein the second selector valve is configured to selectively communicate the first input port to an output port, and to selectively communicate the second input port to the output port, wherein the output port is in fluid communication with an outlet line,
wherein the first and second selector valves are configured to allow flow through only the motorized pump to bypass the main fuel pump to the outlet line in a low flow mode, to allow flow through only the main fuel pump to bypass the motorized pump to the outlet line in a mid-flow mode, and to allow flow through the motorized pump to output to an inlet of the main fuel pump to then output from the main fuel pump to the outlet line in a high flow mode.

\* \* \* \* \*